United States Patent
Neerju et al.

(10) Patent No.: US 11,455,321 B2
(45) Date of Patent: Sep. 27, 2022

(54) DEEP DATA CLASSIFICATION USING GOVERNANCE AND MACHINE LEARNING

(71) Applicant: INTERNATIONAL BUSINESS MACHINES CORPORATION, Armonk, NY (US)

(72) Inventors: Neerju Neerju, Chelmsford, MA (US); Kunjavihari Madhav Kashalikar, Hudson, MA (US); Namit Kabra, Hyderabad (IN); Likhitha Maddirala, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

(21) Appl. No.: 16/823,988

(22) Filed: Mar. 19, 2020

(65) Prior Publication Data
US 2021/0294817 A1 Sep. 23, 2021

(51) Int. Cl.
*G06F 7/00* (2006.01)
*G06F 16/28* (2019.01)
*G06F 16/22* (2019.01)
*G06N 20/00* (2019.01)

(52) U.S. Cl.
CPC .......... *G06F 16/285* (2019.01); *G06F 16/221* (2019.01); *G06N 20/00* (2019.01)

(58) Field of Classification Search
CPC ...... G06F 16/285; G06F 16/221; G06N 20/00
USPC .................................................. 707/600–899
See application file for complete search history.

(56) References Cited

U.S. PATENT DOCUMENTS

| | | | |
|---|---|---|---|
| 5,727,199 A | 3/1998 | Chen et al. | |
| 6,266,656 B1 | 7/2001 | Ohno | |
| 6,834,287 B1 | 12/2004 | Folk-Williams et al. | |
| 8,666,998 B2 | 3/2014 | Nelke et al. | |
| 2002/0138492 A1 | 9/2002 | Kil | |
| 2007/0280528 A1* | 12/2007 | Wellington | G06V 10/457 382/154 |

FOREIGN PATENT DOCUMENTS

| | | |
|---|---|---|
| CN | 106022143 | 10/2016 |
| CN | 108595657 | 9/2018 |
| CN | 110569289 | 12/2019 |

OTHER PUBLICATIONS

Bhide et al.,"The Power of Profiling: How automated classification aids data governance", https://www.ibm.com/cloud/blog/power-profiling-automated-classification-aids-data-governance, IBM, Jan. 19, 2018, 10 pages.

(Continued)

*Primary Examiner* — Isaac M Woo
(74) *Attorney, Agent, or Firm* — Rakesh Roy; Andrew D. Wright; Roberts Calderon Safran & Cole P.C.

(57) ABSTRACT

A method of data classification includes: identifying a cluster of data classes; classifying columns of a current data set; identifying the cluster in the current data set; determining, based on the cluster, an expected column is missing from the current data set; determining a neighboring data set; identifying the expected column in the neighboring data set; classifying the expected column in the neighboring data set; creating a new data class in the current data set; and classifying an unclassified column in the current data set or the neighboring data set with the new data class.

20 Claims, 5 Drawing Sheets

(56) References Cited

OTHER PUBLICATIONS

Moser, "Introducing automatic data classification for Collibra Catalog", https://www.collibra.com/blog/introducing-automatic-data-classification-for-collibra-catalog#, Collibra, accessed Feb. 25, 2020, 9 pages.

Pathak, "Classify to Completion: A Data Cataloging Story", https://blogs.informatica.com/2017/03/14/classify-completion-data-cataloging-story/, Informatica, Mar. 14, 2017, 6 pages.

Muthuraman et al., "Data Classification Using Machine Learning Approach", https://www.researchgate.net/publication/320549282_Data_Classification_Using_Machine_Learning_Approach, ResearchGate, Jan. 2018, 12 pages.

* cited by examiner

| | | | | | |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

| Name | | | Credit Card Number | Expiry Date | |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

| Name | NameP1 | NameP2 | Credit Card Number | Expiry Date | |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

| Name | NameP1 | NameP2 | Credit Card Number | Expiry Date | NameP2 |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

| Name | NameP1 | NameP2 | Credit Card Number | Expiry Date | NameP2 |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

402

| Name | |
|---|---|
| James | 231 |
| William | 123 |
| Elizabeth | 321 |
| James | 222 |
| Charlotte | 789 |
| Elizabeth | 879 |
| | 987 |
| | 777 |
| | 654 |

| Name | NameP1 | NameP2 | Credit Card Number | Expiry Date | NameP2 |
|---|---|---|---|---|---|
| James | Jan | S520 | 1234-4567-5678-6789 | 02-23 | |
| William | Walan | M400 | 1111-2222-3333-4444 | 03-23 | |
| Elizabeth | Elsabat | H312 | 2222-3333-4444-5555 | 04-23 | |
| James | Jan | S520 | 3333-4444-5555-6666 | 02-23 | |
| Charlotte | Carlat | E346 | 4444-5555-6666-7777 | 02-23 | |
| Elizabeth | Elsabat | H312 | 5555-6666-7777-8888 | 03-24 | |
| | | | 6666-7777-8888-9999 | 02-24 | M400 |
| | | | 7777-8888-9999-0000 | 04-22 | E346 |
| | | | 8888-9999-0000-1111 | 03-23 | H312 |

402

| Name | CVV |
|---|---|
| James | 231 |
| William | 123 |
| Elizabeth | 321 |
| James | 222 |
| Charlotte | 789 |
| Elizabeth | 879 |
| | 987 |
| | 777 |
| | 654 |

FIG. 4F

DEEP DATA CLASSIFICATION USING GOVERNANCE AND MACHINE LEARNING

BACKGROUND

Aspects of the present invention relate generally to data management and, more particularly, to data classification.

Enterprises generate data from business processes and tasks. The entire lifecycle of data elements is called enterprise information lifecycle management (EILM). EILM is the practice of applying policies based on business classification of data for effectively managing information. A basic tenet concerning EILM is to identify and classify data elements based on the data value, business criticality of the data and the nature of the business. The data management policies concerning creation, distribution, consumption, disposition, and destruction then apply to the classified data elements.

SUMMARY

In a first aspect of the invention, there is a computer-implemented method including: identifying, by a computing device, a cluster of data classes; classifying, by the computing device, columns of a current data set; identifying, by the computing device, the cluster in the current data set; determining, by the computing device and based on the cluster, an expected column is missing from the current data set; determining, by the computing device, a neighboring data set; identifying, by the computing device, the expected column in the neighboring data set; and classifying, by the computing device, the expected column in the neighboring data set.

In another aspect of the invention, there is a computer program product including one or more computer readable storage media having program instructions collectively stored on the one or more computer readable storage media. The program instructions are executable to: identify a cluster of data classes; classify columns of a current data set; identify the cluster in the current data set; determine, based on the cluster, an expected column is missing from the current data set; determine a neighboring data set; identify the expected column in the neighboring data set; classify the expected column in the neighboring data set; create a new data class in the current data set; and classify an unclassified column in the current data set or the neighboring data set with the new data class.

In another aspect of the invention, there is system including a processor, one or more computer readable storage media, and program instructions collectively stored on the one or more computer readable storage media. The program instructions are executable to: identify a cluster of data classes; classify columns of a current data set; identify the cluster in the current data set; determine, based on the cluster, an expected column is missing from the current data set; determine a neighboring data set; identify the expected column in the neighboring data set; classify the expected column in the neighboring data set; create a new data class in the current data set; and classify an unclassified column in the current data set or the neighboring data set with the new data class.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIGS. 4A-F illustrate an exemplary use case in accordance with aspects of the invention.

DETAILED DESCRIPTION

Aspects of the present invention relate generally to data management and, more particularly, to data classification. Disclosed is a method of classifying data in a data set after a classification algorithm has already classified known classes. These new classes could be one of the known classes (which were missed due to being placed in a different table) or in a way related to the known classes and can provide vital information, which otherwise could have been skipped.

Data classification is the process of assigning a data class to a database column. A data class is an asset that categorizes database columns according to the type of the data in the columns and how the data is used. Data classification can be performed automatically, manually, or a mixture of automatically and manually. For instance, by using regular expressions or a dictionary of values, a machine-based algorithm may be able to automatically detect that a column contains a ZIP code, a US address, a person name, an email address, a phone number, etc. This ability to classify columns based on the values they contain is important since it documents a cryptic physical source with semantic information and facilitates its mapping to a business term or a logical model, which is well understood by the user. Data classification is therefore useful as a tool for classifying data that can be used by enterprises to answer questions such as: Which types of data are available? Are the data protected with the right controls? Do the controls meet the compliance needs as mandated by the industry?

Data classification provides the following benefits to enterprises: data compliance and risk management; optimization of data encryption needs as all data need not be encrypted; better control of disaster recovery and business continuity needs; enhanced metadata management as result of classification of data assets; and appropriate data security controls and access based on the criticality of the data. Therefore, proper data classification protects enterprises from compliance issues and plays a vital role in EILM.

Data classification on structured data may be done by testing the values or the metadata or properties of each column against the classifiers associated to the searched data class. Each data class to be found is associated with a classifier which is a rule or heuristic defining how to decide if a tested value, or a column as a whole, matches the classification criteria of the data class or not. Examples of classifiers are regular expressions (also called regex), list of values, or other rules returning a confidence that the column matches the data class. In that process, each column is tested independently from other columns. There are few instances where a system takes into consideration the context of the data or what has been found in nearby columns of the same data set. For example if a date is mentioned next to credit card, a system might be programmed to assume that the date is an expiration date. The result of the classification process is a list of data classes that are likely to match the data contained in each tested column and a confidence that the classification is a good representation of the column. However, there are many instances in which an automated system is not able to classify one or more columns in a data set. Aspects of the invention address this problem by providing techniques for automatically classifying unclassified columns in a data set.

Implementations of the invention improve the technology of automated data classification by providing novel techniques for classifying columns in a data set that are otherwise unclassified by conventional automated data classification techniques. Implementations of the invention also provide a technical solution to technical problem of columns that cannot be classified using conventional automated data classification techniques. In embodiments, the technical solution comprises: using machine learning to determine clusters of columns in previously classified data sets; identifying one of the clusters in a current data set; identifying an expected column of the cluster that is missing in the current data set; determining a neighboring data set using machine-based algorithms; identifying the expected column in the neighboring data set; and classifying the expected column in the neighboring data set based on the cluster identified in the current data set. By classifying a previously unclassified column, implementations of the invention improve data governance, since many data governance rules (e.g., such as EILM rules) are predicated based on a data class of a column. For example, by classifying a previously unclassified column, implementations of the invention provide for improved data security of the data in that column, since proper data classification combined with EILM rules helps prevent inadvertent data breaches.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
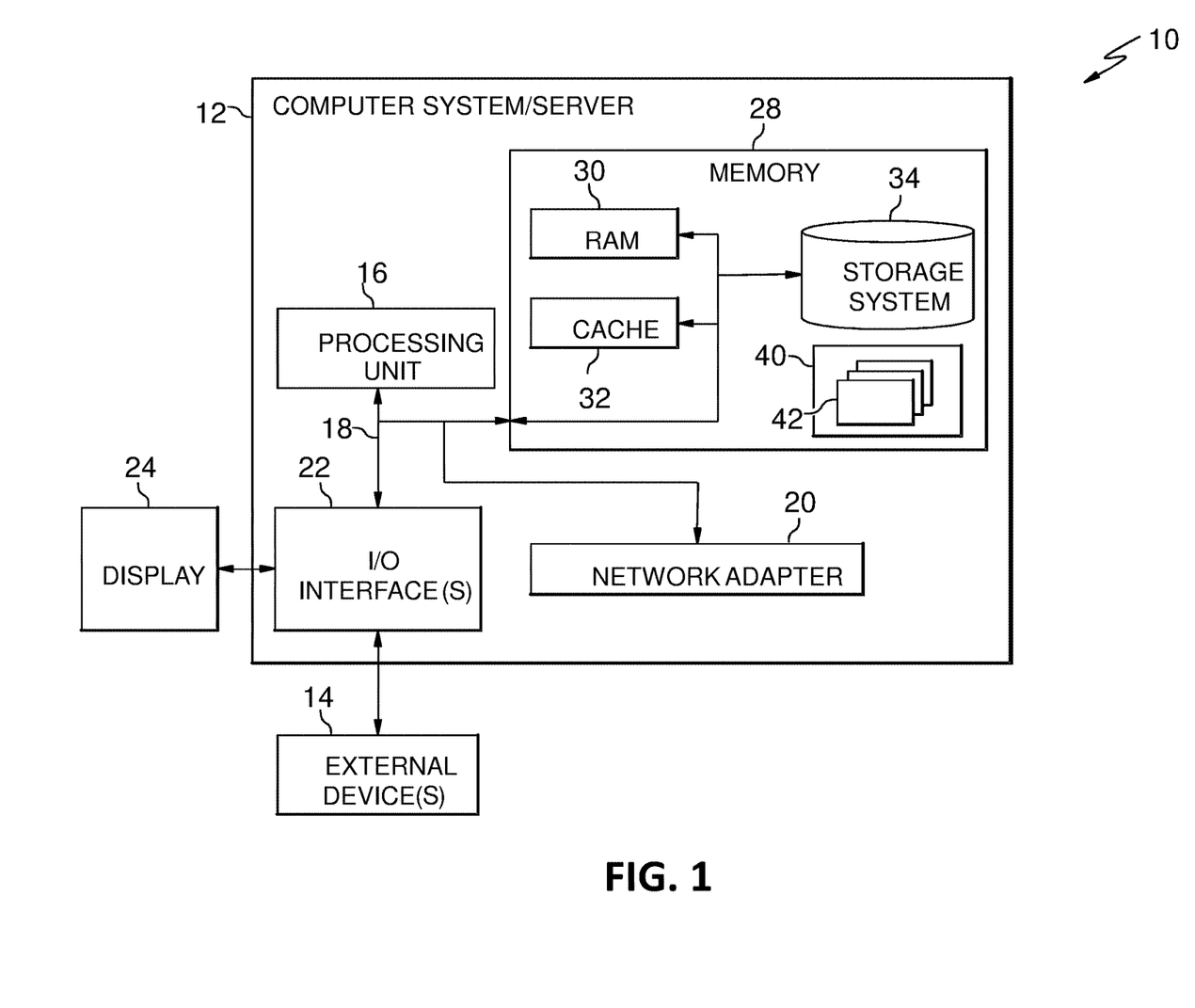
FIG. 1 depicts a computer infrastructure according to an embodiment of the invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
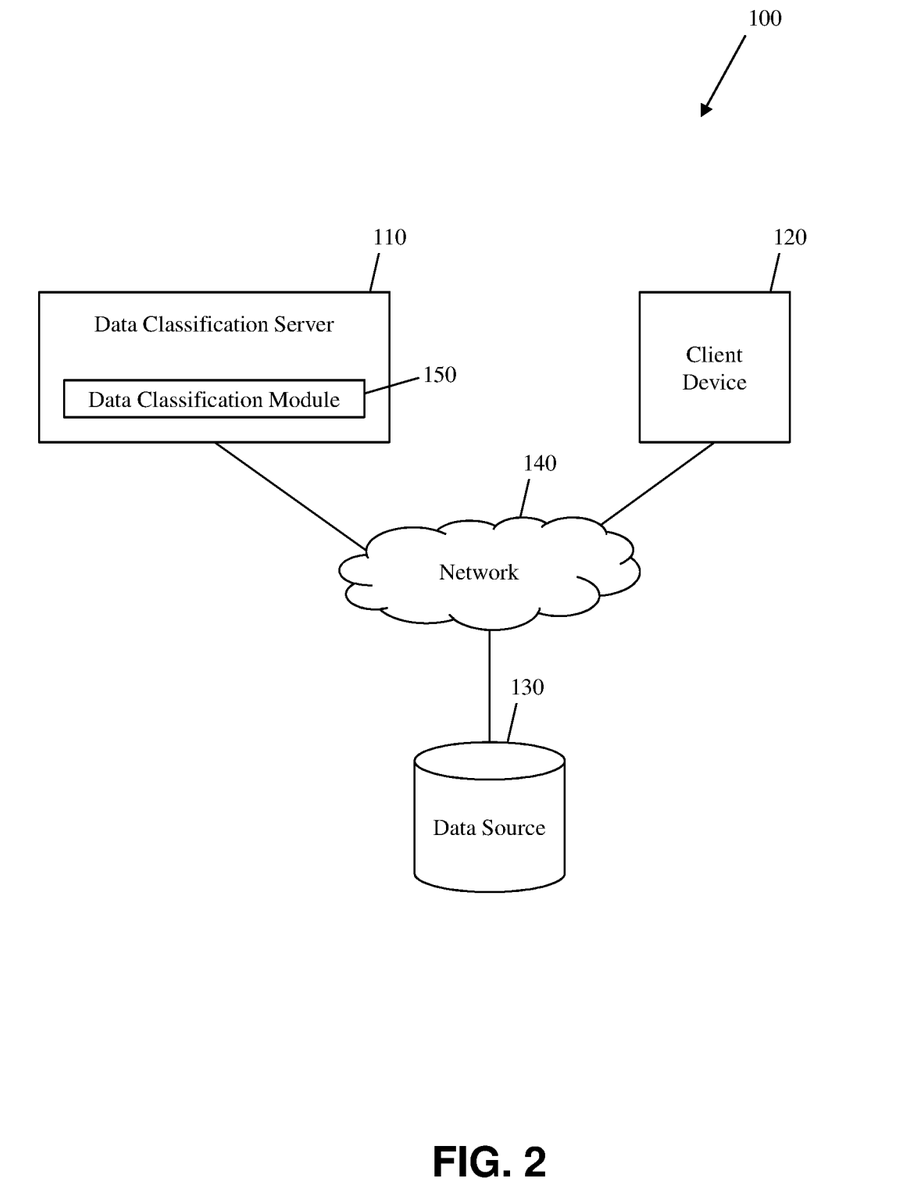
FIG. 2 shows a block diagram of an exemplary system in accordance with aspects of the invention.

FIG. 2 shows a block diagram of an exemplary system 100 in accordance with aspects of the invention. In embodiments, the system 100 includes a data classification server 110 connected to a client device 120 and a data source 130 via a network 140. The network 140 is any suitable computer communication network, such as a LAN, WAN, or the Internet, or any suitable combination of one or more such networks.

The client device 120 comprises a computer device such as a laptop computer, desktop computer, tablet computer, etc., and may comprise one or more components of the computer system/server 12 of FIG. 1. In embodiments, the client device 120 runs a client application that communicates with the data classification server 110 to perform data classification processes on one or more data sets stored on the client device 120 and/or in the data source 130. In embodiments, the client application running on the client device 120 is a software application, and may comprise one or more program modules 42 as described with respect to FIG. 1. In embodiments, the client device 120 communicates with the data classification server 110 via the network 140.

The data source 130 is any source suitable for storing data sets that are the subject of data classification processes as described herein. The may be data source 130 may be comprised in the data classification server 110, comprised in the client device 120, or may be a separate component of the system 100. The data source 130 may comprise physical data storage, such as one or more hard drives, solid state drives (SSDs), Tape Drives, and other memory devices. Additionally or alternatively, the data source may be implemented as a database.

The data classification server 110 may comprise a physical device (e.g., a computer device such as computer system/server 12 of FIG. 1), a virtual machine (VM), or a container (e.g., a Docker container). The term "Docker" may be subject to trademark rights in various jurisdictions throughout the world and is used here only in reference to the products or services properly denominated by the mark to the extent that such trademark rights may exist.

In embodiments, the data classification server 110 comprises data classification module 150, which may comprise one or more program modules such as program modules 42 described with respect to FIG. 1. The data classification server 110 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

The data classification module 150 is configured to perform one or more processes in accordance with aspects of the present disclosure. In one implementation, the data classification module 150 is configured to: determine clusters by analyzing previously classified data sets; classify columns of current data set; identify a cluster in the classified columns of the current data set; generate a new class in the current data set; apply the new class to an unclassified column in the current data set; determine an expected column of the cluster is missing in the current data set; determine a neighboring data set; identify the expected column in the neighboring data set; classify the expected column in the neighboring data set (if found); and apply the new class to an unclassified column or increase the confidence of the column in the neighboring data set.

In accordance with aspects of the invention, the data classification module 150 analyzes historic data that has already been labeled and, based on this analysis, determines clusters of columns that frequently occur together. The analysis may comprise unsupervised machine learning techniques, and in particular may comprise clustering techniques, and even more particularly may comprise k-means clustering. In this manner, the data classification module 150 analyzes historic data sets (e.g., hundreds or even thousands of tables, the columns of which have previously been classified) to determine clusters of columns that appear together in a respective data set. For example, based on analyzing the historic data in this manner, the data classification module 150 may determine a first cluster of columns that appear together more than a threshold amount of the time, the first cluster of columns including: first name, last name, gender, title, and middle name. In another example, based on analyzing the historic data in this manner, the data classification module 150 may determine a second cluster of columns that appear together more than the threshold amount of the time, the second cluster of columns including: credit card number, expiry date, and card verification value (CVV) number. In this manner, the data classification module 150 determines that when one of the columns of a cluster is present in a data set, then there is a high likelihood that other columns of that cluster are also present in the data set. For example, based on this clustering analysis, the data classification module 150 can determine that a data set containing columns labeled credit card number and expiry date is also expected to have a column labeled CVV number.

Aspects of the invention leverage this learned knowledge of clusters to classify unclassified data in a data set. In embodiments, the data classification module 150 identifies a cluster in a classified data set, and determines that a column that is expected to be in the cluster in, in fact, not presently classified in the data set. For example, the data classification module 150 may identify a credit card cluster in a data set based on determining the presence of columns labeled credit card number and expiry date in the data set. In this example, based on identifying the cluster that normally includes columns labeled credit card number, expiry date, and CVV number, the module 150 expects the data set to include a column labeled CVV number. In response to determining the data set does not include a column labeled CVV number, the module 150 determines that this expected column of the cluster is missing from the data set. Based on this determination of the data set missing an expected column of a cluster, the module 150 identifies at least one neighboring data set (e.g., a data set with a determined relation to the current data set that is being classified), and attempts to identify the expected column of the cluster (e.g., CVV number in this example) at one of the columns in the neighboring data set. Based on identifying the expected column in the neighboring data set, the module 150 either classifies the column in the neighboring data set (i.e., if the column is not yet classified) or adjusts a confidence of the classification of the column in the neighboring data set (i.e., if the column is already classified).

This situation may arise when data that is normally clustered together is split into two different data sets for any of various reasons. A column that is split from its cluster in a first data set and saved in another data set poses a data security risk if the column is unclassified or is improperly classified. This is because data that is unclassified or improperly classified likely will not be handled correctly by data governance rules, such as EILM rules, that operate based on data classifications.

Figure 3:
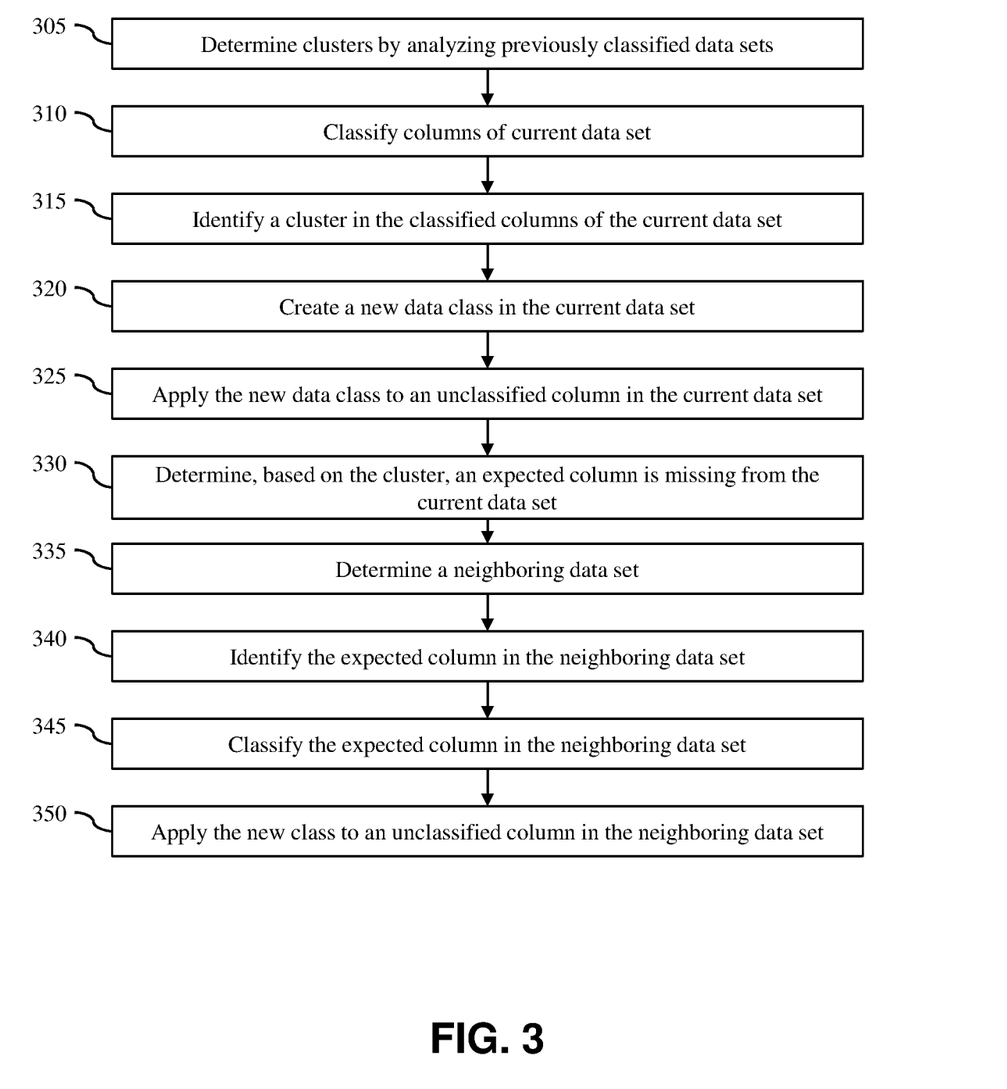
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system determines clusters by analyzing previously classified data sets. In embodiments, and as described with respect to FIG. 2, the data classification module 150 analyzes multiple classified data sets to determine clusters of columns that frequently appear together. The analysis may comprise unsupervised machine learning techniques, and in particular may comprise clustering techniques, and even more particularly may comprise k-means clustering. In this manner, the data classification module 150 analyzes historic data sets (e.g., hundreds or even thousands of tables, the columns of which have previously been classified) to determine clusters of columns that appear together in data sets.

At step 310, the system classifies columns of a current data set. In embodiments, the module 150 uses machine-based classification algorithms to classify the data in a current data set. In implementations, the current data set is specified by the client device 120, e.g., in a request or instruction from the client device 120 to the data classification server 110. For example, a user of the client device 120 may provide input that specifies the current data set to be classified, e.g., by name and/or storage location of the current data set. In implementations, the current data set is stored in the data source 130, and the module 150 accesses (or obtains a copy of) the current data set from the data source 130 in response to a request or instruction from the client device 120.

In aspects of the invention, the current data set comprises a table including plural columns and rows of data. In embodiments, at step 310, the module 150 uses machine-based classification algorithms to automatically classify different columns in the table. The use of machine-based classification algorithms to automatically classify different columns in a table is understood by those of skill in the art, such that further explanation is not necessary. In some instances, machine-based classification algorithms are unable to automatically classify one or more columns in a table. As a result, in some instances, some of the columns of the current data set are classified after step 310, and other ones of the columns of the current data set are unclassified after step 310.

At step 315, the system identifies a cluster in the classified columns of the current data set. In embodiments, the module 150 compares the data classes of the classified columns of the current data set (classified at step 310) to the clusters determined at step 305. In embodiments, the module 150 determines the existence of a cluster in the current data set based on determining a threshold number of data classes of the cluster are present in the current data set. In embodiments, the threshold number is a configurable setting, such as greater than 50% of the data classes in a cluster are present in the current data set.

At step 320, the system creates a new data class in the current data set. In embodiments, the module 150 creates a new data class based on comparing an unclassified column in the current data set to classified columns in the current data set, and determining a 1-to-1 relationship between the unclassified column and one of the classified columns. In embodiments, the module 150 filters the columns used in this comparison based on number of distinct values in the columns and null count in the columns. For example, based on such filtering, the module 150 only compares an unclassified column to a classified column when the unclassified column and the classified column contain a comparable number of distinct values and have a similar null count.

With continued reference to step 320, after the filtering, the module 150 attempts to identify a classified column in the current data set that has a 1-to-1 relationship to an unclassified column in the current data set. In this context, a 1-to-1 relationship refers to consistent and repeated correspondence of data values between the two columns. In embodiments, a 1-to-1 relationship exists when, in respective rows of the columns, a same data value appears in the unclassified column with every instance of a particular data value in the classified column. For example, the data set may comprise plural rows that contain "ABC" in the classified column and plural rows that contain "DEF" the in the same classified column. In this example, a 1-to-1 relationship exists when, for every row that contains "ABC" in the classified column, the same row always contains the data value "XYZ" in the unclassified column, and for every row that contains "DEF" in the classified column, the same row always contains the data value "123" in the unclassified column. By comparing data in rows in this manner, the module 150 is programmed to determine a 1-to-1 relationship between an unclassified column and one of the classified columns in the current data set.

Still referring to step 320, the module 150 creates a new data class for a particular unclassified column in the current data set based on determining that the particular unclassified column has a 1-to-1 relationship with a classified column in the current data set. In embodiments, the module 150 creates the new data class by creating a new class definition that is based on, for example, valid values of the new data class (e.g., all the values in the rows of the unclassified column) or a determined pattern (e.g., a regular expression, or regex) of values in the rows of the unclassified column. In embodiments, step 320 comprises classifying the particular unclassified column with the new data class. In this manner, the particular column is no longer unclassified after step 320, but rather is classified with the new data class. Step 320 may be repeated numerous times for a single current data set to create plural different new data classes in the current data set.

At step 325, the system applies the new data class (created at step 320) to at least one other unclassified column in the current data set. In embodiments, the module 150 pushes the new data class to applicable unclassified columns in the current data set. In embodiments, the module 150 compares the data in an unclassified column to the new class definition (e.g., valid values or regex) created at step 320, and classifies the unclassified column with the new data class when the data in an unclassified column matches the new class definition. In this manner, step 325 results in a previously unclassified column being classified with the new data class.

At step 330, the system determines, based on the cluster identified at step 315, that an expected column is missing from the current data set. In embodiments, the module 150 determines an expected column is missing (e.g., not present) in the current data set by comparing the classified columns in the current data set to the set of data classes of the cluster, and determining that at least one of the data classes of the cluster is not represented by one of the classified columns in the current data set. For example, the module may have determined at step 315 that the 'credit card' cluster is present in the current data set based on determining that columns 'credit card number' and 'expiry date' columns are present in the current data set; and at step 330, the module 150 may determine that the data class 'CVV', which is one of the data classes of the 'credit card' cluster, is not present as one of the classified columns of the current data set. Based on this, the module 150 determines that the current data set is missing the expected column 'CVV' from the cluster 'credit card'.

At step 335, the system determines a neighboring data set to the current data set. In aspects of the invention, a neighboring data set is a data set that has a determined relationship to the current data set. In embodiments, the module 150 determines a neighboring data set by comparing the current data set to plural other data sets using one or more of the following techniques: foreign key analysis; overlap analysis; governance analysis (e.g., common terms); schema analysis (e.g., nearness in a database); and usage analysis (e.g., the data sets are used together in a data pipeline). Each of these techniques is understood by those skilled in the art, such that further explanation is not necessary. In some embodiments, the system receives user input that indicates which of one or more of these techniques to use for finding a neighboring data set. In some embodiments, the system uses machine learning (e.g., over time by analyzing the techniques used in historic analyses) to determine which one or more of these techniques to use for finding a neighboring data set. In some embodiments, the system uses a single level check for a neighboring data set, such as with a primary key—foreign key relationship. In other embodiments, the system uses a plural level check for a neighboring data set, e.g., by using plural ones of the noted techniques.

At step 340, the system identifies the expected column (from step 330) in the neighboring data set (from step 335). In embodiments, the module 150 identifies the expected column in the neighboring data set by using deep analysis techniques. In one example, the module 150 compares the data contained in a column of the neighboring data set to the class definition of the data class of the expected column (e.g. the data class of the cluster that is not in the current data set).

At step 345, the system classifies the expected column that was found in the neighboring data set at step 340. In embodiments, based on identifying the expected column in the neighboring data set, the module 150 either classifies the column in the neighboring data set (i.e., if the column in the neighboring data set is not yet classified) or adjusts a confidence of the classification of the column in the neighboring data set (i.e., if the column in the neighboring data set is already classified). In embodiments, the module 150 classifies the column in the neighboring data set using (e.g., assigning) the data class of the expected column (e.g. the data class of the cluster that is not in the current data set). In embodiments, the module 150 adjusts a confidence of the classification of the column in the neighboring data set by increasing the confidence value if the classification of the column matches the data class of the expected column, or by decreasing the confidence value if the classification of the column does not match the data class of the expected column.

At step 350, the system applies the new data class (created at step 320) to an unclassified column in the neighboring data set (from step 335). In embodiments, the module 150 pushes the new data class to applicable unclassified columns in the neighboring data set. In embodiments, the module 150 compares the data in an unclassified column to the new class definition (e.g., valid values or regex) created at step 320, and classifies the unclassified column with the new data class when the data in an unclassified column matches the new class definition. In this manner, step 350 results in a previously unclassified column in the neighboring data set being classified with the new data class.

FIGS. 4A-F illustrate an exemplary use case in accordance with aspects of the invention. Aspects of the exemplary use case may be performed in accordance with steps of the method of FIG. 3 and are described referring to these steps.

Figure 4A:
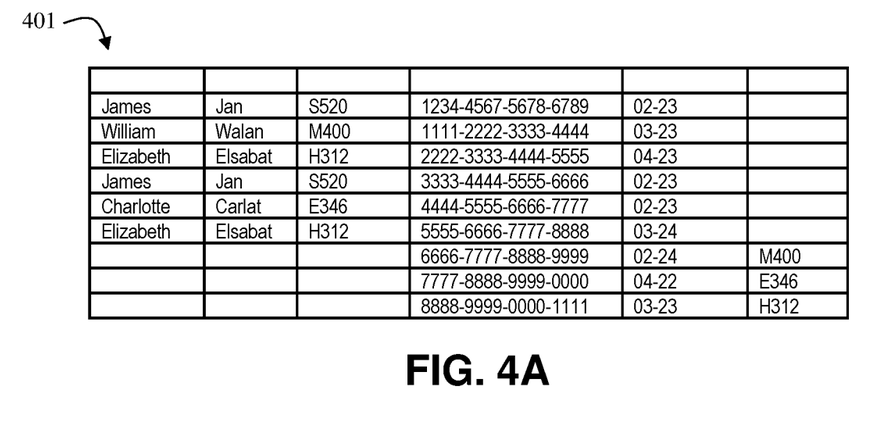
Figure 4B:
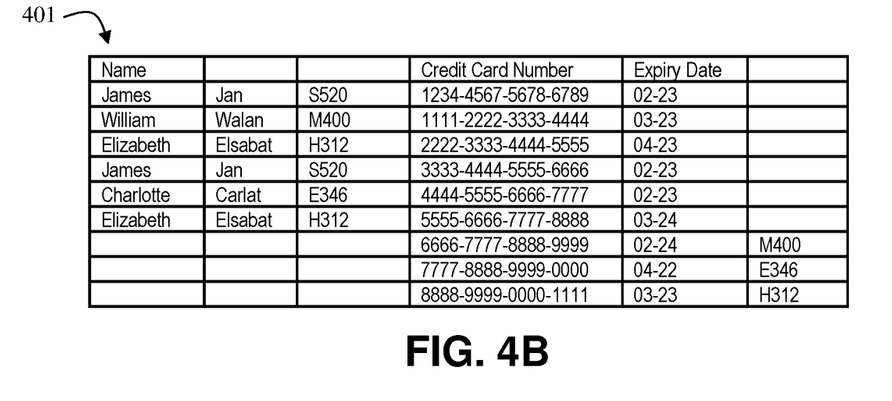

FIG. 4A shows a data set 401 that is not yet classified, e.g., as prior to step 310. FIG. 4B shows the data set 401 after the classification of step 310. As seen in FIG. 4B, some columns are classified, e.g., 'Name', 'Credit Card Number', and 'Expiry Date', and other columns remain unclassified after step 310.

Figure 4C:
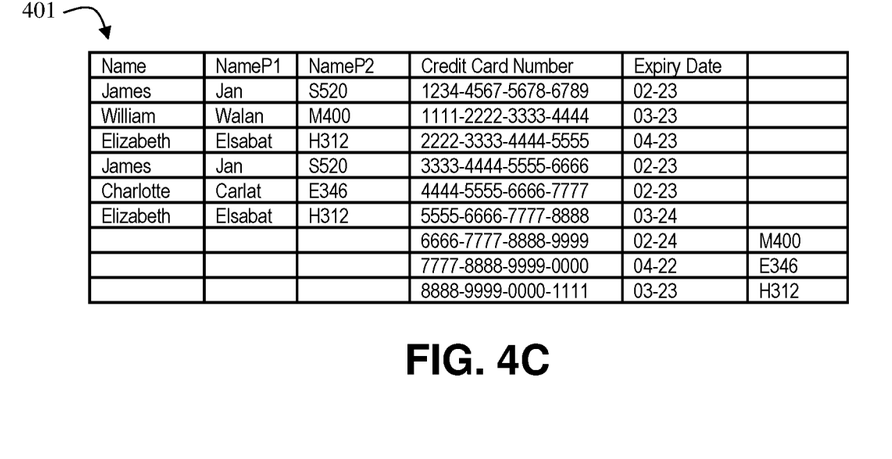

FIG. 4C shows the data set 401 after the creation and application of new data classes at step 320. In this example, the module 150 determines that the second column has a 1-to-1 relationship with the first column, and creates a new class 'NameP1' for the second column. Also in this example, the module 150 determines that the third column has a 1-to-1 relationship with the first column, and creates a new class 'NameP2' for the third column. FIG. 4D shows the data set 401 after applying the new data class 'NameP2' to the previously unclassified sixth column in the data set, e.g., as described at step 325.

FIGS. 4E and 4F illustrate steps 310, 315, 330, 335, 340, and 345. In this exemplary use case, after classifying the columns of the data set (e.g., as at step 310), the module 150 identifies the 'credit card' cluster (e.g., as at step 315) based on columns 'Credit Card Number' and 'Expiry Date' being in close proximity to one another in the data set 401. The module 150 determines that the data class 'CVV' that is included in the 'credit card' cluster is missing from the data set 401 (e.g., as at step 330). The module 150 identifies a neighboring data set 402 (e.g., as at step 335) and identifies a column corresponding to the data class 'CVV' (e.g., the expected column) in the neighboring data set 402 (e.g., as at step 340). As shown in FIG. 4F, the module 150 classifies the column in the neighboring data set 402 by assigning the data class 'CVV' to the column (e.g., as at step 350).

In embodiments, the intelligent classification described herein can be tuned to be run in multiple levels, e.g., first level related datasets, second level, and so on. The new data classes created in the process can also be relevant to other domains, and they can be used for classification with lower confidence in other domains as well.

As should be apparent from the description herein, aspects of the invention provide a system and method to classify columns (which are not classified by traditional classification) by looking at a 1-to-1 correlation with an already classified dataset, using machine learning (e.g., clustering) to learn that this column appears along with other columns, and by looking for a missing column in the neighborhood of the column (e.g., within the same dataset or the dataset in the same schema). The neighboring dataset can be found using relationship analysis, governance (seeing a relation of a term with another), and foreign key analysis. The system may utilize relationship vectors which learn the relationships between various columns. The system may introduce domain analysis to find if a classification exists or not in a domain. The system may establish a neighborhood by the usage of the dataset, for instance, whether they are commonly used in multiple projects, are commonly used by a user, or used together for same reports.

As should be apparent from the description herein, aspects of the invention provide a method for classifying columns/fields in a dataset having multiple tables, comprising: performing an initial classification of a subset of the columns/fields using known techniques, for a first column/field that went unclassified during the initial classification, identifying a one-to-one relationship with a second classified column/field, where the second classified column/field is in a different table than the first column/field but is in a same neighborhood as the first column/field, and applying a classification to the first column/field based on the identified one-to-one relationship. The method may further comprise, based on the initial classification, identifying clusters of classifications that occur together, for a third column/field that went unclassified during the initial classification, identifying a missing-data relationship with a fourth classified column/field, where the fourth classified column/field is in a different table than the third column/field but is in a same neighborhood as the third column/field, and where the missing-data relationship is identified based on determining that the third column/field is likely to occur together with the fourth classified column/field according to the identified clusters, and applying a classification to the third column/field based on the missing-data relationship.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   identifying, by a computing device, a cluster of data classes;
   classifying, by the computing device, columns of a current data set;
   identifying, by the computing device, the cluster in the current data set;
   determining, by the computing device and based on the cluster, an expected column is missing from the current data set;
   determining, by the computing device, a neighboring data set;
   identifying, by the computing device, the expected column in the neighboring data set; and
   classifying, by the computing device, the expected column in the neighboring data set.

2. The method of claim 1, wherein the identifying the cluster comprises analyzing plural previously classified data sets using a clustering technique.

3. The method of claim 1, wherein the determining the neighboring data set comprises comparing the current data set to plural other data sets using one or more techniques selected from the group consisting of: foreign key analysis; overlap analysis; governance analysis; schema analysis; and usage analysis.

4. The method of claim 1, wherein the determining that an expected column is missing from the current data set comprises comparing the classified columns in the current data set to a set of data classes of the cluster.

5. The method of claim 1, wherein the classifying the expected column in the neighboring data set comprises assigning a data class of the cluster to the expected column in the neighboring data set.

6. The method of claim 1, wherein the classifying the expected column in the neighboring data set comprises adjusting a confidence value of a classification of the expected column in the neighboring data set.

7. The method of claim 1, further comprising creating a new data class in the current data set.

8. The method of claim 7, wherein the creating the new data class is performed in response to determining a 1-to-1 relationship between an unclassified column in the current data set and a classified column in the current data set.

9. The method of claim 7, further comprising applying the new data class to an unclassified column in the current data set.

10. The method of claim 7, further comprising applying the new data class to an unclassified column in the neighboring data set.

11. A computer program product comprising one or more computer readable storage media having program instructions collectively stored on the one or more computer readable storage media, the program instructions executable to:
    identify a cluster of data classes;
    classify columns of a current data set;
    identify the cluster in the current data set;
    determine, based on the cluster, an expected column is missing from the current data set;
    determine a neighboring data set;
    identify the expected column in the neighboring data set;
    classify the expected column in the neighboring data set;
    create a new data class in the current data set; and
    classify an unclassified column in the current data set or the neighboring data set with the new data class.

12. The computer program product of claim 11, wherein:
    the identifying the cluster comprises analyzing plural previously classified data sets using a clustering technique;
    the current data set comprises a database table including rows and columns of data; and
    the previously classified data sets comprise plural other tables including rows and columns of data.

13. The computer program product of claim 11, wherein the determining the neighboring data set comprises comparing the current data set to plural other data sets using one or more techniques selected from the group consisting of:

foreign key analysis; overlap analysis; governance analysis; schema analysis; and usage analysis.

14. The computer program product of claim 11, wherein the determining that an expected column is missing from the current data set comprises comparing the classified columns in the current data set to a set of data classes of the cluster.

15. The computer program product of claim 11, wherein the classifying the expected column in the neighboring data set comprises one of: assigning a data class of the cluster to the expected column in the neighboring data set; and adjusting a confidence value of a classification of the expected column in the neighboring data set.

16. A system comprising:
  a processor, one or more computer readable storage media, and program instructions collectively stored on the one or more computer readable storage media, the program instructions executable to:
  identify a cluster of data classes;
  classify columns of a current data set;
  identify the cluster in the current data set;
  determine, based on the cluster, an expected column is missing from the current data set;
  determine a neighboring data set;
  identify the expected column in the neighboring data set;
  classify the expected column in the neighboring data set;
  create a new data class in the current data set; and
  classify an unclassified column in the current data set or the neighboring data set with the new data class.

17. The system of claim 16, wherein the identifying the cluster comprises analyzing plural previously classified data sets using k-means clustering.

18. The system of claim 16, wherein the determining the neighboring data set comprises comparing the current data set to plural other data sets using foreign key analysis.

19. The system of claim 16, wherein the determining that an expected column is missing from the current data set comprises comparing the classified columns in the current data set to a set of data classes of the cluster.

20. The system of claim 16, wherein the classifying the expected column in the neighboring data set comprises one of: assigning a data class of the cluster to the expected column in the neighboring data set; and adjusting a confidence value of a classification of the expected column in the neighboring data set.

* * * * *